(12) United States Patent
Farrow et al.

(10) Patent No.: US 8,571,835 B2
(45) Date of Patent: Oct. 29, 2013

(54) VIBRATION POWERED IMPACT RECORDER (VPIR)

(75) Inventors: Reginald Conway Farrow, Somerset, NJ (US); Gordon Albert Thomas, Princeton, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 215 days.

(21) Appl. No.: 12/792,372

(22) Filed: Jun. 2, 2010

(65) Prior Publication Data
US 2011/0004444 A1 Jan. 6, 2011

Related U.S. Application Data

(60) Provisional application No. 61/183,255, filed on Jun. 2, 2009, provisional application No. 61/183,271, filed on Jun. 2, 2009.

(51) Int. Cl.
G06F 17/40 (2006.01)
G01N 1/00 (2006.01)
G11C 13/02 (2006.01)

(52) U.S. Cl.
USPC ............................. 702/187; 73/652; 307/400

(58) Field of Classification Search
USPC ............... 702/187, 33, 41–42, 44, 56–57, 60, 702/64–65, 81, 84, 127, 130–131, 138–141, 702/188–189, 193; 73/1.37, 1.79, 1.82, 73/488, 497, 503, 510–511, 514.01, 73/514.32, 570, 649, 652; 257/414–415; 307/151–156, 400; 310/311, 313 A, 310/314, 316.01, 316.03, 317–318, 320, 310/328–331, 338–339
See application file for complete search history.

(56) References Cited

U.S. PATENT DOCUMENTS

| 7,081,693 | B2 | 7/2006 | Hamel et al. | |
| 2008/0036617 | A1* | 2/2008 | Arms et al. | 340/679 |
| 2009/0212665 | A1* | 8/2009 | Koser et al. | 310/339 |

OTHER PUBLICATIONS

Huang et al., Self-Powered CMOS Impact-Rate Monitors for Biomechanical Implants, 2008 IEEE, pp. 385-388.*
R. Ghaffarian, D. G. Sutton, Paul Chaffee, N. Marquez, A. K. Sharma and A. Teverovsky, "Thermal and Mechanical Reliability of Five COTS MEMS Accelerometers", http://nepp.nasa.gov/eeelinks/February2002/Thermal_and_Mechanical_Reliability.htm, (2002).
S. Meninger, J. O. Mur-Miranda, R. Amirtharajah, A. P. Chandrakasan, and J. H. Lang, "Vibration-to-Electric Energy Conversion", IEEE Trans. VLSI Systems, 9, 64-75 (2001).

(Continued)

Primary Examiner — Toan Le
(74) Attorney, Agent, or Firm — Matthew B. Dernier, Esq.; Gibson & Dernier LLP

(57) ABSTRACT

A vibration-powered impact recording device that harvests power from vibrations that affect the device is provided. The recording device is affixed to an object and includes a vibration limit detection and recordation system. The system can include a suitable part that is fixed to the object, and a mass (or other suitable part) that is less firmly attached, with the relative motion between the two parts producing an electrical voltage. The electrical voltage can be used to power an information storage unit that records the details of the impact and optionally other sensors which record other parameters such as temperature, humidity etc. at the time of impact.

23 Claims, 12 Drawing Sheets

(56) References Cited

OTHER PUBLICATIONS

S. Roundy, Paul Wright and Kristofer S. J. Pister, "Micro-Electrostatic Vibration-to-Electricty Converters", Proceedings of IMECE'02, 2002 ASME International Mechanical Engineering Congress & Exposition, New Orleans, Louisiana 17-22, (2002).

C.B. Williams, A Pavic, R.S. Crouch, and R.C. Woods., "Feasibility Study of Vibration-Electric Generator for Bridge Vibration Sensors" reprinted from the IMAC-XVI Proceedings, 1997 with permission of the Society for Experimental Mechanics, Inc. pp. 1111-1117, (1997).

* cited by examiner

PRIOR ART

VIBRATION POWERED IMPACT RECORDER (VPIR)

CROSS REFERENCE TO RELATED APPLICATIONS

This application claims the benefit of U.S. Provisional Patent Application No. 61/183,255, filed Jun. 2, 2009, and U.S. Provisional Patent Application No. 61/183,271, filed Jun. 2, 2009, the entire disclosures of which are incorporated herein by reference.

STATEMENT REGARDING FEDERALLY SPONSORED RESEARCH OR DEVELOPMENT

The research leading to the present invention was supported, in part by grants. Accordingly, the United States Government may have certain rights in the invention.

FIELD OF INVENTION

This invention relates to various aspects of vibration, shock, impact, and acceleration detection and recordation.

BACKGROUND OF THE INVENTION

To address the possible danger or damage objects by vibration (or a series of shocks or impacts) during transport or storage, different systems are employed to detect whether vibrations have occurred that are outside specific limits. For example, ordnance subjected to shocks or vibration may be prematurely armed or vehicles/machinery subjected to high stress may lose structural integrity and become unsafe for use. MEMS (Micro-Electro-Mechanical Systems) based accelerometers are now commonly used as vibration sensors on many military and consumer applications including safety systems for automobiles. An alternative is an electret accelerometer which has lower power requirements.

A high-g accelerometer (>10 g maximum range) is typically used for fuse, safe and arm applications in the military. This class of accelerometers is used for shock, vibration, and inertial measurements. MEMS-based accelerometers generally use capacitive sensing to detect the deflection of an inertial mass. The example shown in FIG. 10 is the Analog Devices ADXL250, which has been in production by Analog Devices of Norwood, Mass., since 1993. FIG. 10 is a perspective view, including enlarged inserts, of a conventional capacitive accelerometer. FIG. 10 shows a beam 1002, a spring 1004, capacitive sense plates 1006 and stationary polysilicon fingers 1008. Also shown in blown-up inserts in FIG. 10 are fingers 1010 and spring attachment 1012.

The ADXL250 employs two sensors that are on orthogonally oriented axes. Each one is a differential capacitor sensor that has a fixed plate of polysilicon fingers and an inertial mass consisting of a moving plate that responds to the acceleration. MEMS accelerometers are mounted in hermetically sealed packages that protect them from humidity. Sensors manufactured by Analog Devices, Motorola Semiconductor Products, Kistler Instrument Corporation, and Dallas Semiconductor have been subjected to a range of reliability tests by NASA (R. Ghaffarian, D. G. Sutton, Paul Chaffee, N. Marquez, A. K. Sharma and A. Teverovsky, "Thermal and Mechanical Reliability of Five COTS MEMS Accelerometers"), the results of said tests are hereby incorporated by reference herein in their respective entireties. The ADXL250 showed only minor parametric changes during thermal cycling from −65° C. to 185° C. and 2000 g shock testing for 30,000 shocks. Other sensors remained within nominal specifications during thermal cycling from −40° C. to 85° C.

As evident from the foregoing discussions, the accelerometer detection logic circuitry and software technology are mature and known in the art. However, in view of the diverse operating environments of such systems, they would need to meet stringent requirements in order to be useful. Some of the key requirements are: 1) vibration (shock, impact)/amplitude detection and recordation, with limits that can be customized for specific objects, 2) reliability under wide variations in temperature and humidity, and 3) powering the recordation system throughout the lifetime of the object (several years or more if needed). While the first two of these requirements may be addressed with mature technology, the third requirement is generally addressed by employing batteries to power the detection/recordation systems. However, powering the VPIR continuously would drain the batteries in a relatively short time thereby limiting its prospects for long term use. Thus, while a battery-powered impact recorder employing any of the aforementioned MEMS-based accelerometers is feasible, the inventors have found that the need to provide sustainable power for such systems is yet to be satisfactorily met.

SUMMARY OF THE INVENTION

The following presents a simplified summary of the various aspects of the invention in order to provide a basic understanding of some aspects described herein. This summary is not an extensive overview, and is not intended necessarily to identify key/critical elements or to delineate the scope of the claimed subject matter.

A system to detect and record the history of impacts, shocks, or vibrations and, preferably, to determine whether these impacts, shocks, or vibrations that have occurred are outside of the tolerance limits of an object is disclosed in accordance with one or more aspects of the invention. Preferably, the system would be powered in such a way that will provide power through the lifetime of the packaged ordnance. Various embodiments disclosed herein may be used to detect whether substantial and/or extraordinary vibrations have occurred in an object thereby determining its utility for further use.

A method for recording information regarding vibrations is disclosed in accordance with one or more aspects of the invention. The method comprises providing a self-powered vibration recorder on an object for which it is desired to record the vibrations. When the object experiences an impact, the vibrations from the shock, impact or acceleration are employed to induce charge within an electrical circuit comprised within the recorder. The charge thus induced is used for powering a signal transfer to a load wherein the signal includes information relating to the vibration, shock, impact or acceleration. The induced charge is based on relative displacement of a mass present within an impact sensor provided in the recorder with respect to the object. Thus, the magnitude of the charge will depend on the displacement of the mass such that the signal transfer occurs only when charge above a predefined threshold is induced. It can thus be appreciated that the magnitude of the induced charge is indicative of the amplitude of the vibration. In a further aspect, the load can comprise a non-volatile memory unit which is operable for storing the information relating to the impact as received from the signal. The non-volatile memory can be read at a later stage to determine whether a shock-initiated vibration of the object has occurred. This method further facilitates using the induced charge to power one or more other sensors to record other parameters such as temperature, humidity, etc. at a time of occurrence of the impact. Therefore, this method facilitates determining the state of ordnance, a vehicle, or a machine after impact.

In another aspect, a method for sensing motion of an object is disclosed wherein at least one sensor is employed to sense motion of an object. An electrical indicator, for example, an induced charge or current generated within a circuit is received at a load from the at least one sensor wherein the load comprises one or more memory units. The memory units are powered by employing energy from the motion and information related to the motion is stored in the memory units. The magnitude of the induced charge/current generated within the circuit can based on amplitude of displacement of a mass within the sensor such that the information is stored in the memory units only when the charge is above a predetermined threshold. In a further aspect, other sensors can also be employed to sense other parameters such as heat, humidity or presence of light at the time of occurrence of the motion. The other sensors can also be powered by the energy generated from the motion of the object and may be connected to the memory units in order to record information related to the other parameters. Use of a plurality of sensors aligned along different directions is also contemplated in accordance with a more detailed aspect.

A vibration powered impact recorder (VPIR) that detects vibration/motion in an object is disclosed in accordance with this embodiment. The recorder comprises one or more vibration frequency/amplitude detection components that detect occurrence of vibrations in the object and a recording component, for example, a non-volatile memory element, such as a flash memory, that records information related to the vibrations. In addition, the recorder comprises circuitry for a vibration-based power supply that powers at least the recording component for the usable life of the object. In different aspects, the VPIR can comprise a single vibration detecting component or it can comprise a plurality of vibration detection components oriented in different directions. In particular, the VPIR can comprise three vibration detection components oriented along the three mutually perpendicular axes and sharing a common memory. The vibration detection component of the VPIR may include a first part that remains fixed with respect to the object and a mass attached to the first part, which mass is movable. An occurrence of vibration within the object causes a displacement of the mass and generates an induced charge within the circuit of the vibration-based power supply. The vibration recorder can be designed or customized to meet different sensitivity levels such that only information regarding a signal with a predetermined minimum amplitude is recorded by the recording component. In addition to the recording component, the vibration-based power supply can be employed to power one or more other sensors thereby facilitating recording other parameters, such as temperature or humidity, at the time of the occurrence of the vibration. The vibration detector can optionally comprise an outlet for retrieving the recorded information via an external entity such as a computer. In a different aspect, the recorded information can also be retrieved wirelessly, for example, by using near field communication technologies such as Bluetooth, RFID (radio frequency identification) etc.

A vibration information retrieval system comprising a processor and a memory is disclosed in accordance with yet another embodiment. The processor receives information regarding the vibrations from a memory of a VPIR and determines a state of the object bearing the VPIR thereon based on the received information. The processor is operable to determine one or more of severity, frequency, direction, duration or time of occurrence of the vibration from the information. In addition, the processor can also determine one or more other parameters, such as temperature or humidity, at a time of occurrence of the impact and factor them into the analysis while determining the state of the object. In a further aspect, the processor is also operable to generate notifications if it is determined that the severity of the vibrations and/or other factors exceeds respective predetermined limits for a given application.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE INVENTION

Figure 1:
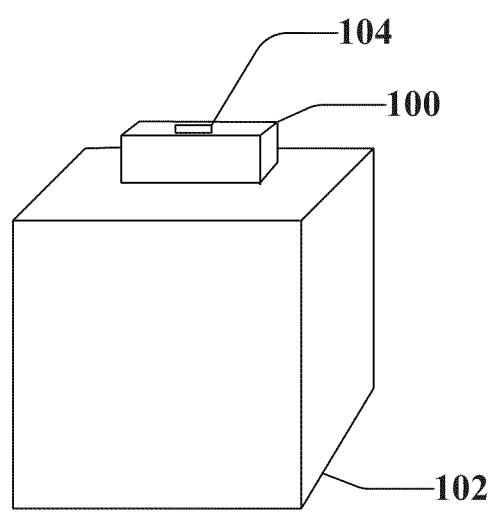
FIG. 1 is a schematic diagram of an impact recorder (VPIR) in use.

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Aspects of the claimed subject matter may be implemented as a method, apparatus, or article of manufacture using standard programming and/or engineering techniques to produce software, firmware, hardware, or any combination thereof to control a computer to implement various aspects of the claimed subject matter. The term "article of manufacture" as used herein is intended to encompass a computer program accessible from any computer-readable device, carrier, or media. For example, tangible computer readable media can include but are not limited to optical disks (e.g., compact disk (CD), digital versatile disk (DVD), etc.), smart cards, magnetic storage devices (e.g., hard disk, floppy disk, magnetic strips, etc.), and flash memory devices (e.g., card, stick, key drive, etc.). Of course, those skilled in the art will recognize many modifications may be made to this configuration without departing from the scope or spirit of what is described herein.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment.

Disclosed herein are systems and methods for vibration, shock, impact, and acceleration detection and recordation. More specifically, the detection of dangerous or substantial levels of impact or vibrations occurring in a sequence or history of periods of mechanical acceleration in ordnance, vehicles, machinery and/or aircrafts (including, but not limited to, planes, helicopters, rockets, and ordnance) is disclosed. For the purposes of this application, the term vehicles may be understood to refer to cars, trucks, boats etc. As discussed supra, in order to satisfy the requirement for power that can be sustained over long periods, systems and methods are proposed herein that include a self-powering strategy. This involves using the impact/vibration that is to be recorded as an energy source thereby mitigating the need for external power sources such as batteries. Therefore, the use of the impact detector/recorder over long periods of time, for example, several years is facilitated.

Turning now to FIG. 1, a schematic diagram of an impact recorder in use is illustrated. An object 102 can have a VPIR 100 affixed thereto to record the vibrations/impacts affecting it. For example, the object 102 can be an ammunition box which may have been dropped during storage or shipment. As a result, the ordnance within the box experiences vibration, shock, impact or acceleration which may have armed or damaged the ammunition contained therein thereby rendering it dangerous. The impact recorder 100 is powered up by the impact itself and records or stores information regarding the impact. When the ammunition box 102 is recovered, perhaps after several years, the data stored in the impact recorder 100 can be retrieved in order to determine the state of the ammunition. This is facilitated via outlet means 104 included on the VPIR data retrieval. In one embodiment of the invention, the external device can communicate with the VPIR using a universal serial bus (USB) connection or by using wireless technologies. In such case, the outlet means 104 can be a USB port which facilitates retrieving data therefrom. In a different aspect, the memory element can be detached from the VPIR 100 for the data retrieval. Thus, the data retrieved from the VPIR 100 can be used to determine if the ammunition contained within the ammunition box 102 is armed based on the information regarding the impacts recorded therein. In accordance with other aspects, the VPIR 100 can also be affixed to vehicles and record the impact experienced by the vehicles over a period of time.

Although the recordation of a single impact is described herein, it may be appreciated that VPIR 100 can record a series of impacts affecting the object 102. In a further aspect, VPIR 100 can be designed with different sensitivity levels based on the necessity of the application. For applications demanding greater sensitivity the VPIR 100 can be designed to have low thresholds so that signals generated by vibrations with low amplitudes are also recorded.

Figure 2A:
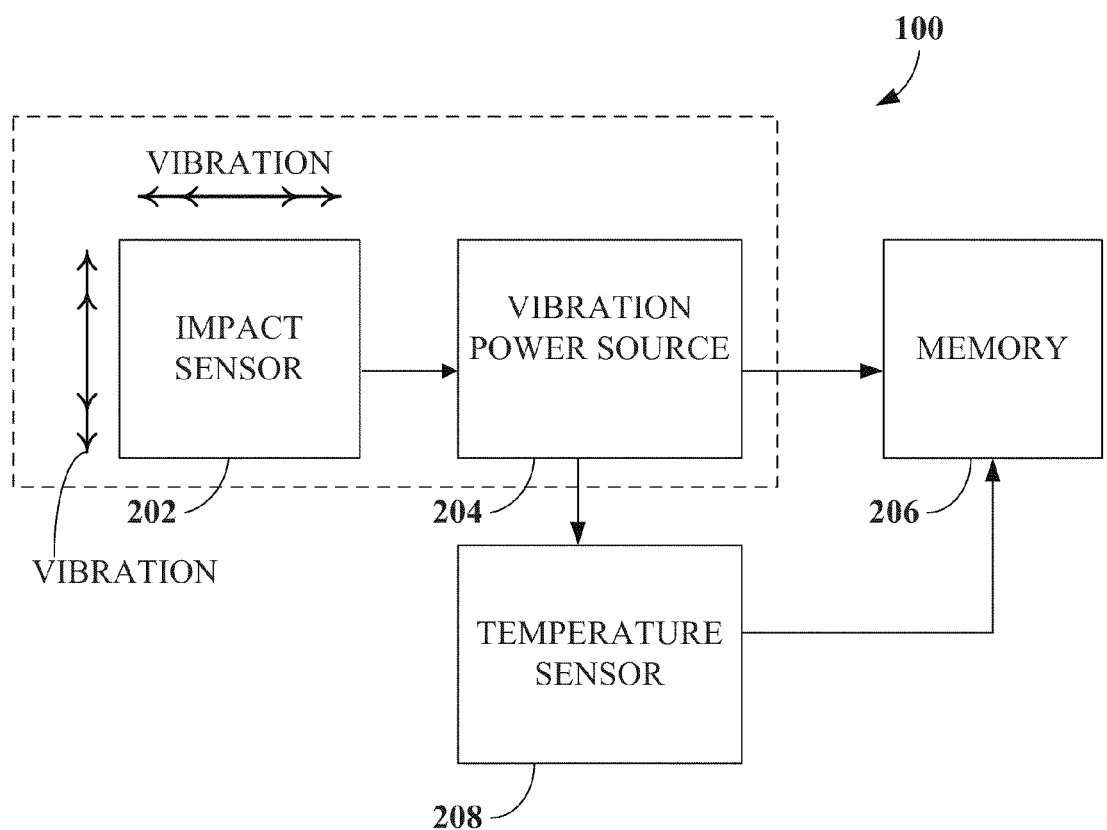
FIG. 2a is a block diagram of the VPIR in accordance with one or more aspects.

FIG. 2a is a block diagram for implementing the VPIR 100 in accordance with one or more aspects. VPIR 100 comprises vibration frequency/amplitude detection components such as impact sensor 202, a vibration-based power source 204, a recording component, such as a memory 206, and can optionally include one or more other sensors, such as a temperature sensor 208. The impact sensor 202 can be a piezoelectric device. Hence, it may be appreciated that, although the impact sensor 202 and vibration-based power source 204 are illustrated as two different elements in FIG. 2a for clarity, they can be implemented as single element as will be detailed infra. When the object 102 having VPIR 100 experiences an impact above the sensitivity threshold of the recorder 100, a mass included in the impact sensor 202 undergoes motion in proportion to the amplitude of the impact. This induces a charge in the vibration power source 204 connected to the impact sensor 202, which charge can be used as a voltage signal to power the memory 206, thereby recording information related to the impact. In one aspect, the information recorded in the memory 206 can be based on the strength of the voltage signal received, thereby indicating the amplitude of the impact. For example, for a typical level of vibrational energy input, VPIR 100 produces power output within the range of 1500-500 micro Watts. This is well above the power requirements of the memory 206, which in accordance with one embodiment can be a low power memory chip with power requirements around 20 micro Watts. Thus, the VPIR 100 is entirely powered by ambient vibrations and thereby eliminates the need for external power supplies, such as batteries. In accordance with another aspect, the impact sensor 202 and/or temperature sensor 208 can be enhanced to provide greater power to the memory 206 as long term flash memory can require greater power than short term memory.

Figure 2B:
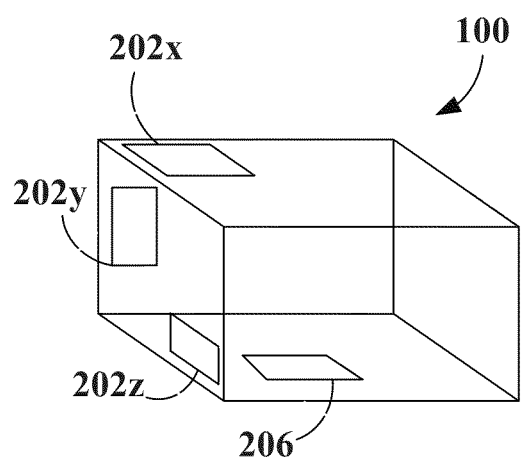
FIG. 2b illustrates another embodiment of the VPIR, wherein a plurality of impact sensors are employed along different directions.

FIG. 2b illustrates another embodiment of the VPIR 100, wherein a plurality of impact sensors 202 are employed along different directions. In particular, three sensors 202x, 202y and 202z are combined and packaged together with each aligned to cover a perpendicular direction of vibration: the x, y, and z directions. In different embodiments, these vibration sensors 202x, 202y and 202z could each have separate memory elements associated therewith or they may share a thermal sensor and a common memory circuit. In the embodiment, the impact sensors 202x, 202y and 202z share a common memory 206, which receives three different signals from each of the sensors 202x, 202y and 202z. Therefore, the VPIR 100 records not only the overall strength of the vibration (which can be resolved by adding the three signals), but also the directional information of impact.

Figure 3:
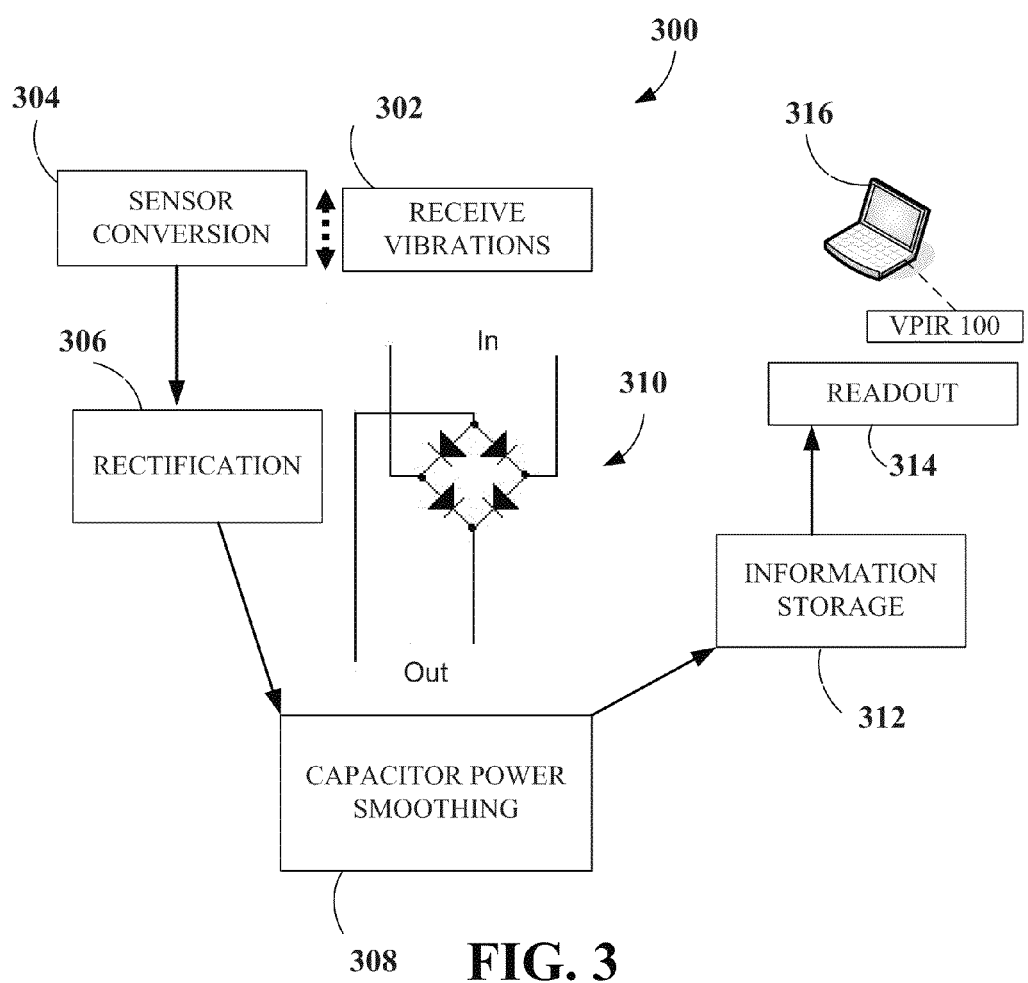
FIG. 3 is a schematic diagram illustrating the operation of the VPIR in accordance with one or more aspects.

FIG. 3 is a schematic diagram 300 illustrating various stages and some of the elements involved in the process of recording and reading vibration information by employing the VPIR 100 as discussed herein. Each time an object bearing the VPIR 100 thereon experiences vibrations 302, the mechanical energy from these vibrations 302 is converted to electrical energy by a sensor as shown at 304. For example, an impact sensor as discussed herein can be used for this purpose. The voltage variations from the sensor at 304 are rectified as shown at 306 with a suitable rectifier, such as, a diode bridge rectifier 310 and are smoothed by a set of capacitors as shown at 308. The analogue signal generated by the sensor is converted into digital format using, for example, A/D conversion techniques well known in the art at an appropriate point within this process and is subsequently recorded as shown at 312 in an \information storage unit (not shown). As discussed supra, the VPIR 100 can be designed for different sensitivity levels based on the threshold amplitude of the impacts. Thus, the information storage unit can be programmed appropriately such that it is turned on only if the signal from the rectifier 310 exceeds a threshold voltage. This stored information can be retrieved at a later time 314 in order to gain knowledge about the vibrations/impacts that caused the information to be stored therein. The readout phase 314 can be facilitated by connecting the VPIR 100 to a processing unit 316 which obtains the information contained therein and analyzes the information in accordance with further aspects as detailed infra.

Figure 4:
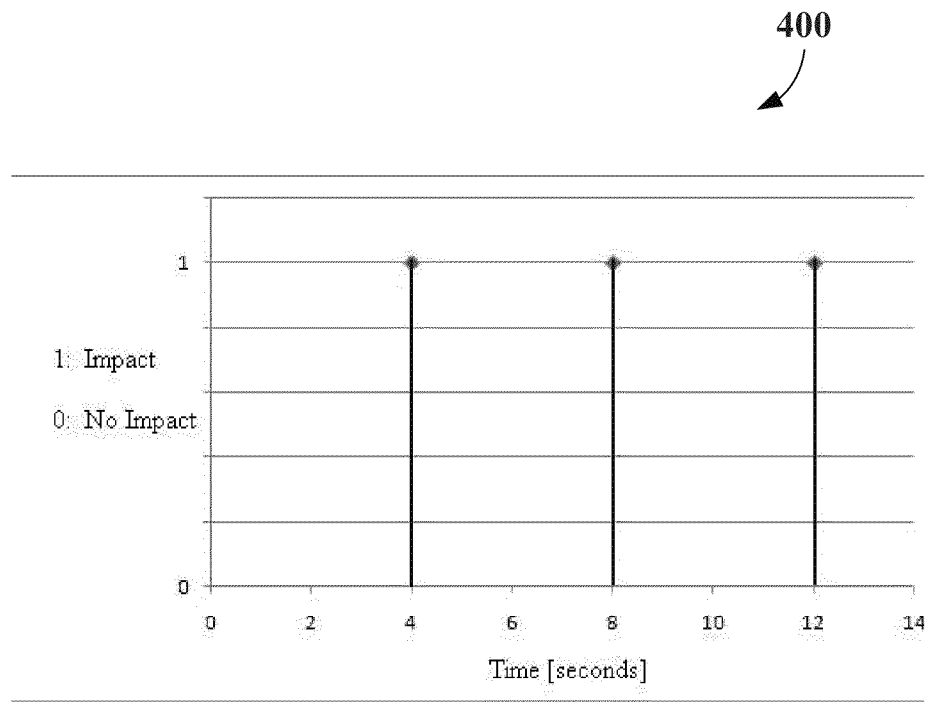
FIG. 4 shows a graph of the output from the VPIR in accordance with one or more embodiments.

FIG. 4 shows a graph 400 of the output from the VPIR 100 in accordance with one or more embodiments. The graph includes time on the x-axis and the presence or absence of vibrations on the y-axis. This output shows that the object 102 bearing the VPIR 100 experienced impact/vibrations above the threshold thrice at 4, 8 and 12 seconds within the time range shown on the x-axis. It can be appreciated that the output can also include other information regarding the amplitude, duration or other characteristics of the vibrations.

Figure 5:
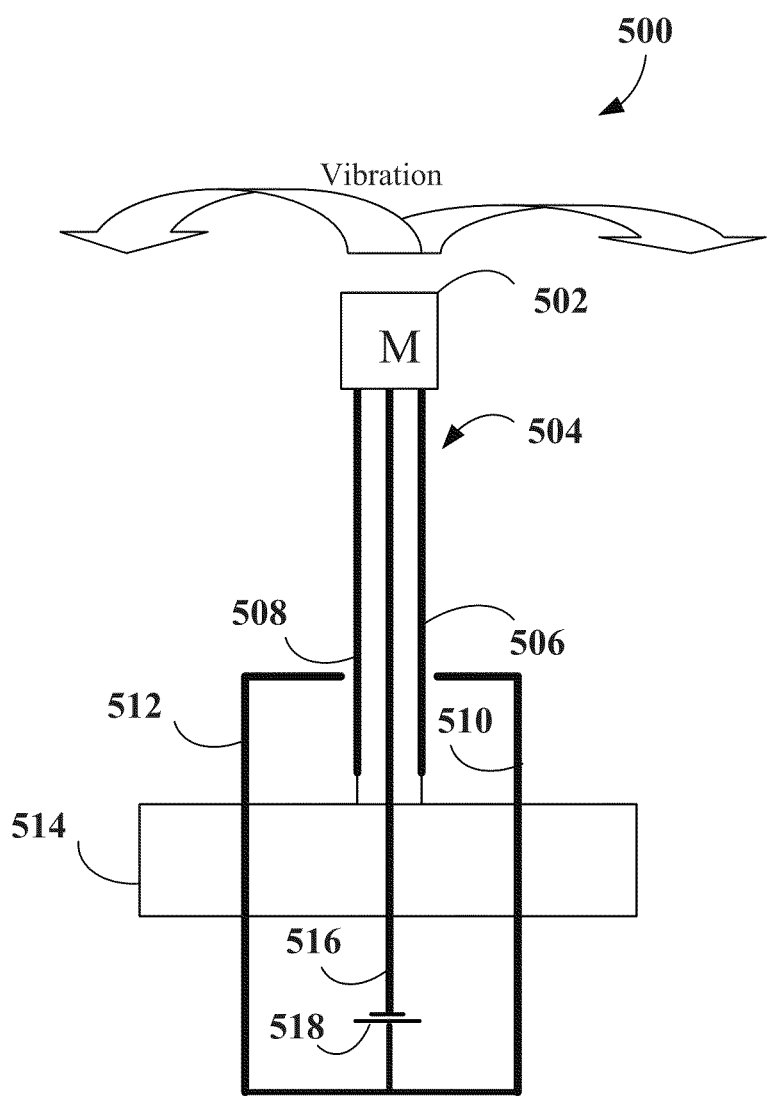
FIG. 5 illustrates a device that can be used as an impact detector/vibration-based power supply according to various aspects disclosed herein.

FIG. 5 illustrates a device 500 that can be used as an impact sensor 202/power source 204 according to various aspects disclosed herein. The device 500 is a transformer that converts vibrations to electrical energy and can be fabricated using MEMS technology. It preferably includes a mass 502 on one end of a flexible electret 504. In this particular embodiment, each side of the electret (506, 508) is a positively charged side of an electret sheet or a piezoelectric sheet including a metal coating. Attached to a fixed base 514 of device 500 are metal fingers 510 and 512 which make contact with the metal coatings on the sides of the electret 506, 508 when electret 504 tips to the right or left as a result of vibration experienced by the VPIR 100. Below the fixed base 514 (or in any other suitable location), the device 500 further comprises a charged metal coat 516 that serves to connect the storage or load 518 to whichever side of electret 504 is in contact with one of metal fingers 510, 512. Therefore, when the mass 502 moves, it causes one of the sides 506 or 508 of the electret 504 to contact the metal fingers 510 or 512 respectively thereby inducing charge within the finger 510 or 512. The amplitude of motion caused in the mass 502 can determine the amount of charge. Thus, the embodiment of FIG. 5 shows a device 500 that can be used to as a vibration-powered impact sensor that converts vibrations it receives into a usable amount of energy.

Figure 6:
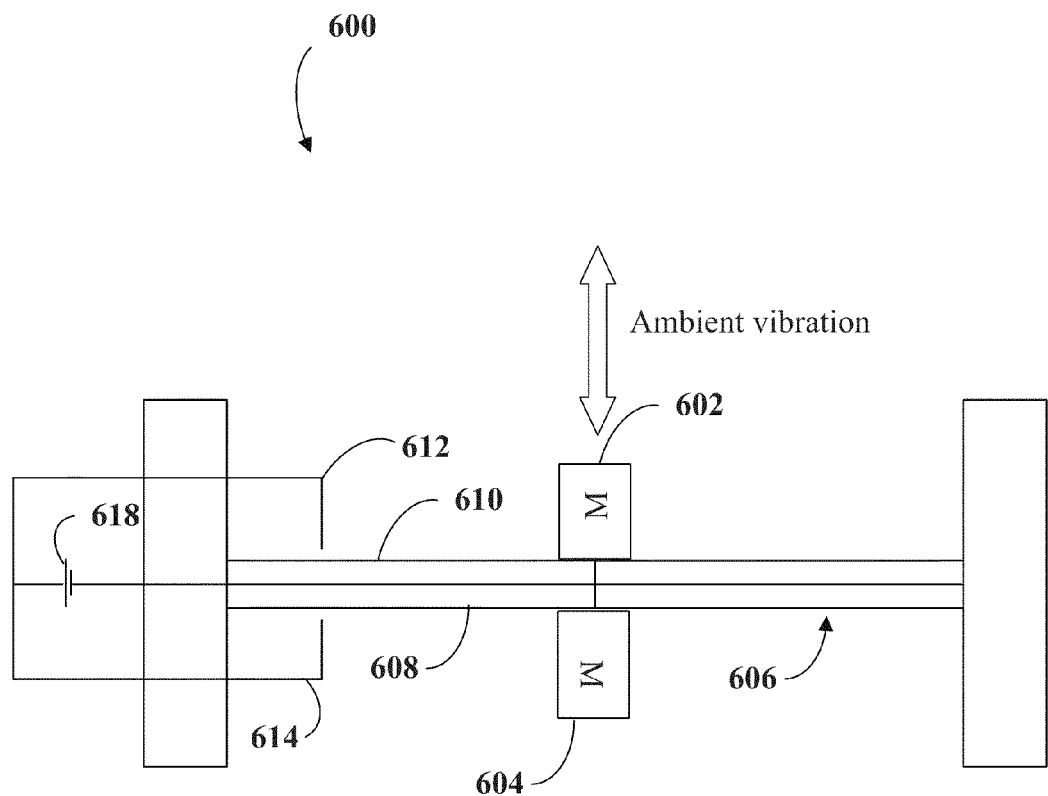
FIG. 6 shows another device that can be used as an impact detector/vibration-based power supply according to another aspect.

FIG. 6 shows another device 600 that can be used as the impact sensor 202 according to another embodiment. This device 600 can also be fabricated using MEMS technology and may be used in methods and/or applications disclosed herein for converting vibratory force into usable electrical energy. Device 600 preferably includes masses 602, 604, electret 606 including sides 608 and 610, metal fingers 612, 614 and storage and/or load 618. In accordance with this embodiment, electret 606 makes contact with fingers 612, 614 when electret 606 tips up or down due to ambient vibrations. This contact induces charge in the metal fingers 612, 614 which powers the load 618.

Although the device 600 exhibits a more constrained motion as compared with the device 500, it provides greater stability, supports larger mass, and has greater resistance to deformation due to deposition of components as compared to the device 500. In a further aspect, the loads 518/618 can transmit the power to the memory element 206 and/or other sensors, such as the temperature sensor 208. Thus, the ambient vibrations are harnessed to record information in the memory 206 regarding not only the vibrations but also other conditions such as temperature etc. at the time of impact. The embodiments of the vibration to electrical energy transformers disclosed herein are particularly suitable for use in the VPIR 100 as they cause no leakage currents or forward bias voltage in the rectifier bridge 308.

Figure 7A:
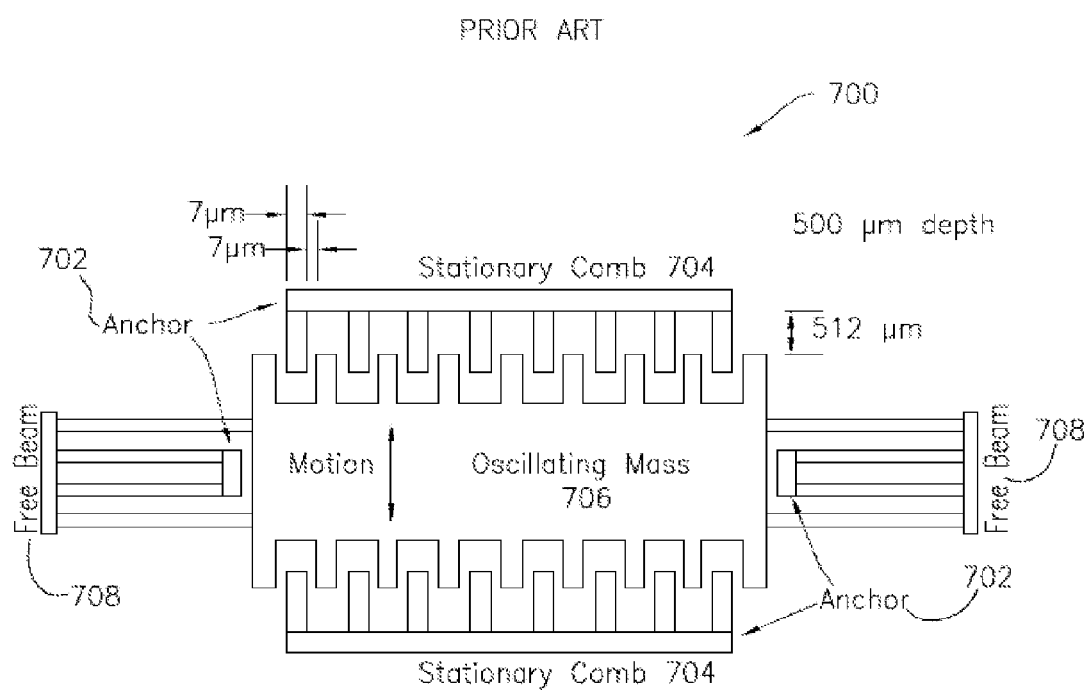
FIG. 7a shows a plan view layout of a MEMS variable capacitor that can be used for conversion of vibrational energy to electric energy in accordance with one or more embodiments.

FIG. 7a shows a plan view layout of a conventional MEMS variable capacitor 700 that can be used for conversion of vibrational energy to electric energy, which can be used in the VPIR 100 in accordance with one aspect. Capacitor 700 preferably includes anchors 702 that fix the position of a portion of the capacitor 700, stationary combs 704 (which also serve as anchors), oscillating mass 706 and weakly-coupled beams 708. In this embodiment, the motion of oscillating mass is indicated as perpendicular with respect to the orientation of the spine of combs 704. "Free"—i.e., weakly-coupled—beams 708 preferably mechanically couple anchors 702 to oscillating mass in such a configuration that allows oscillating mass 706 to move with respect to stationary combs 704.

Figure 7B:
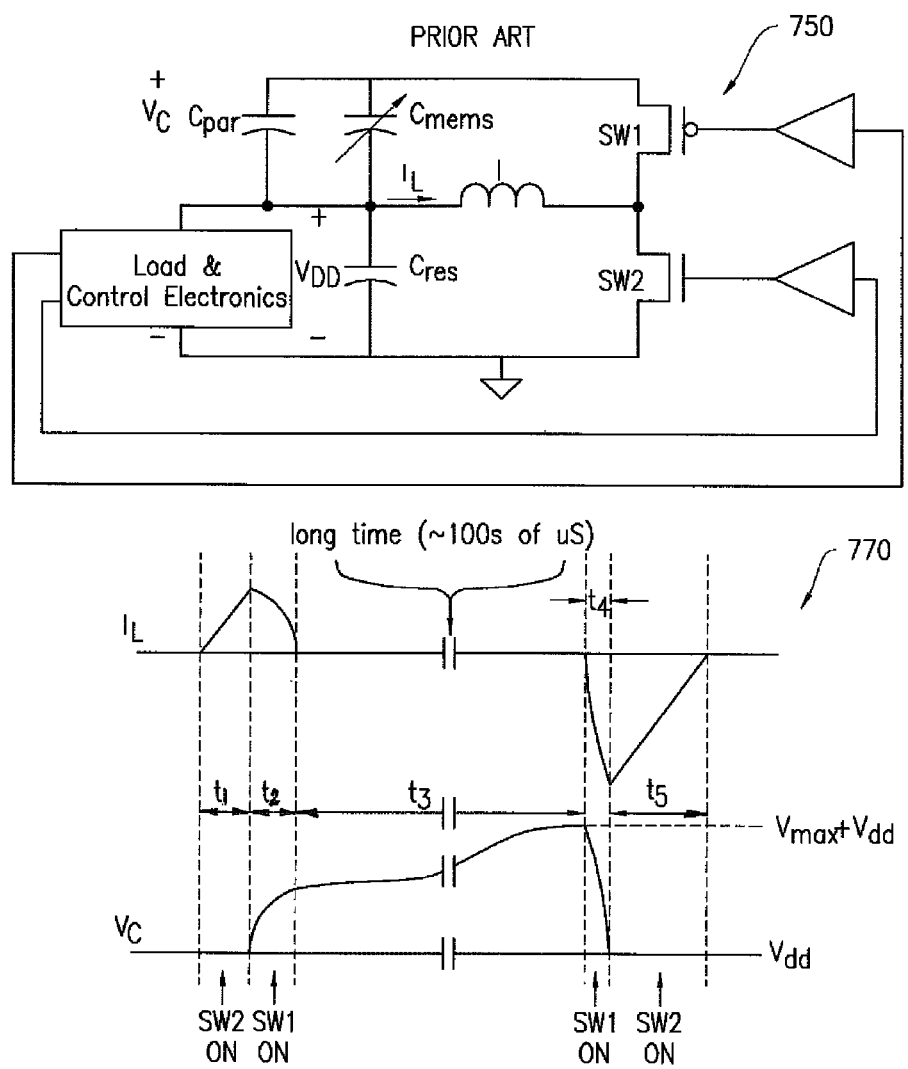
FIG. 7b shows one embodiment of a circuit to convert the induced charge to useable power and timing diagrams therefor.

FIG. 7b shows one embodiment of a circuit 750 to convert the induced charge produced by the MEMS capacitor 700 into useable power. Preferably, circuit 750 can be used to convert the induced charge generated by relative movement of the oscillating mass 706 of capacitor 700 into useable power. At startup, the capacitor combination of $C_{PAR}$ and $C_{MEMS}$ has no voltage across it, so $V_{CC}=V_{DD}$. (All voltages in FIG. 6 are referred to ground.) At this point, the power electronics are waiting for the controller to determine when to begin the conversion process. When the circuit 750 experiences an impact or vibrations above a specified threshold, the trigger occurs for the conversion of the vibrational energy to electricity at the beginning of $t_1$ as shown in the timing diagram 770. During $t_1$, SW2 is on, SW1 is off, and the inductor current increases. At $t_2$, SW2 is off, SW1 is on, and the inductor transfers energy to the capacitor. During $t_3$, both switches are off and the variable capacitor plates move. The mechanical energy has thus moved the plates apart and caused the voltage across the capacitor combination to reach a maximum, and the energy harvesting is therefore performed. During $t_4$, SW1 is on, SW2 is off, and the capacitor combination transfers energy to the inductor. Once the capacitor voltage reaches zero, corresponding to one-quarter of the resonant period of the LC, SW1 is turned off, SW2 is turned on, and the energy input to the inductor is transferred to the reservoir during $t_5$. This process repeats at the frequency of the mechanical vibration, which corresponds to variations in $C_{MEMS}$.

Figure 8:
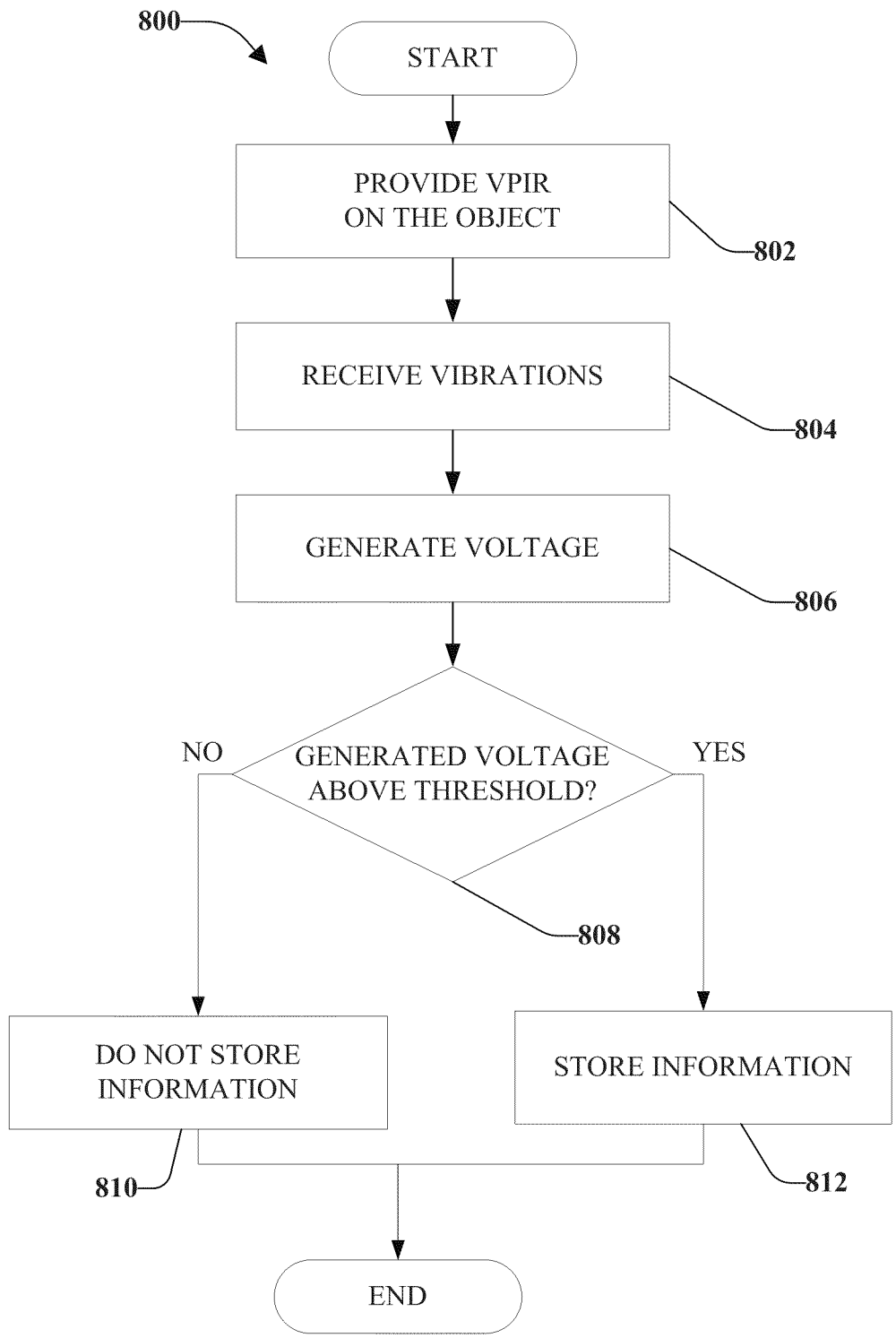
FIG. 8 is a flow chart detailing a method for determining and, preferably, recording information regarding impacts on an object.

FIG. 8 is a flow chart 800 detailing a method for determining and, preferably, recording information regarding impacts on an object 102. The method begins at 802 wherein a VPIR 100 is provided on an object 102, such as ordnance or a vehicle, for which it is desired to record vibrations/impacts. At 804, the vibrations are received at the recorder 100 when the object experiences an impact. At 806, a voltage is generated within the sensor circuit of the VPIR in proportion to the amplitude of the impact. In accordance with different aspects, MEMS components such as the electret 500/600 or the variable capacitor 700 disclosed herein can be used for generation of the voltage. A mass comprised within these components is set in motion as a result of the vibration which induces charge within an electrical circuit of these components. At 808, it is determined if the generated voltage is above a predetermined threshold voltage $V_T$. As discussed supra, the memory 206 can be programmed to record information related to impacts/voltages only above a certain threshold based on the necessity of an application. If it is determined at 808 that the voltage generated is less than the threshold voltage $V_T$, no information is stored as shown at 810 and the method 800 terminates on the end block. If it is determined at 808 that the generated voltage is greater than the threshold voltage $V_T$, the method moves to 812 wherein information regarding the impact is recorded in the memory 206 comprised within the VPIR 100 and subsequently the method terminates on the end block.

The information recorded in the memory 206 can include various parameters of the vibration, such as the time of occurrence of the impact, its amplitude, duration, etc. In addition, various other parameters can also be recorded such as the temperature, humidity, etc. based on the different sensors included in the VPIR 100 and powered by the vibrations. If the object 102 experiences a series of medium level impacts which may not generate a voltage greater than the threshold voltage $V_T$, the signal transfer to the memory 206 can include information relating to the preferably cumulative magnitude of the vibration or the series of medium level impacts.

Figure 9:
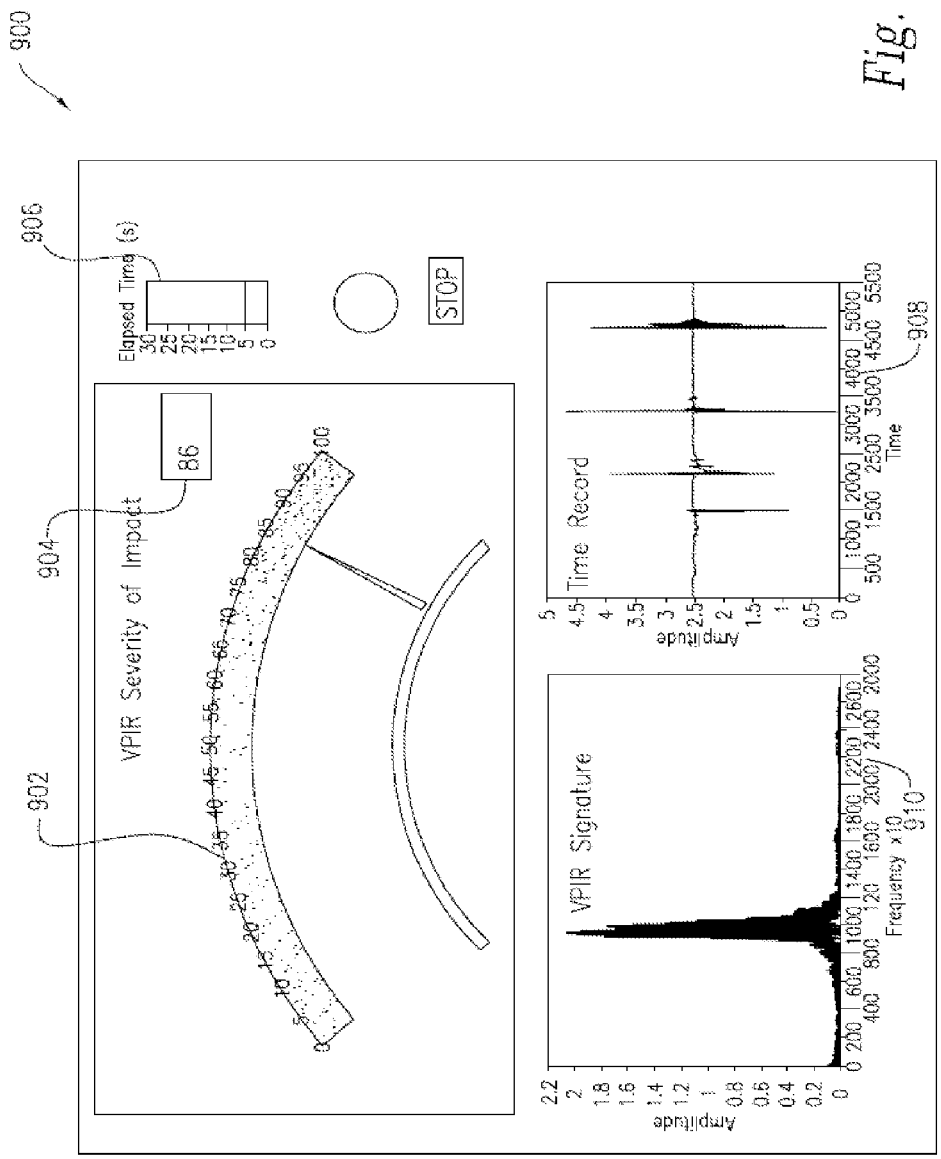
FIG. 9 illustrates a display generated by hardware and/or software that retrieves the information from the VPIR after the recordation of the impacts.
Figure 10:
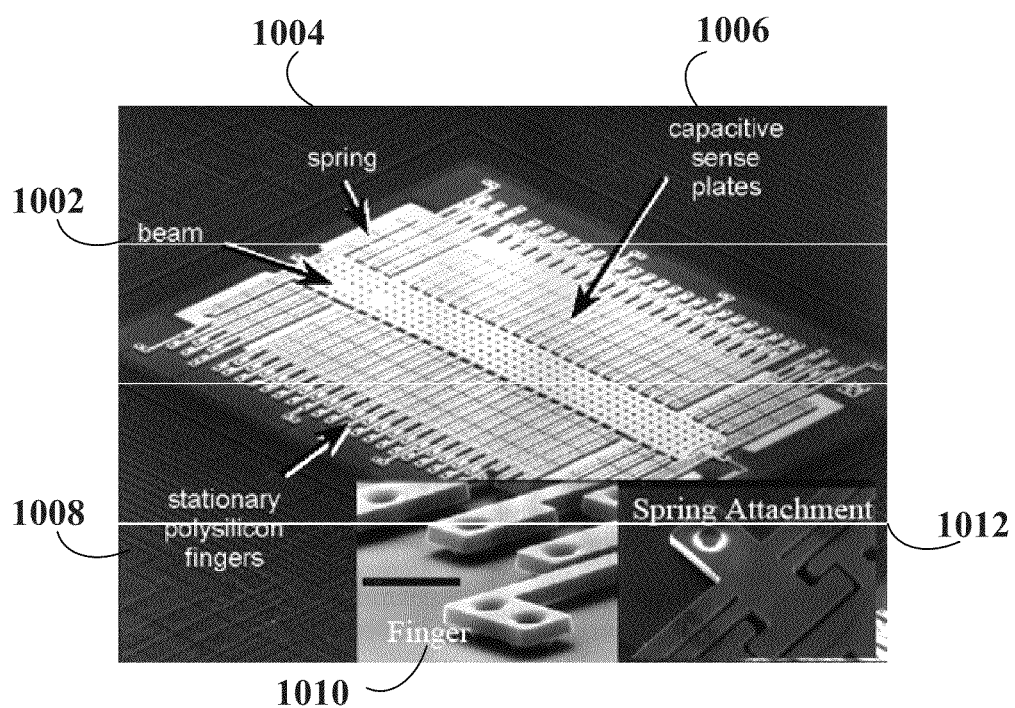
FIG. 10 is a perspective view, including enlarged inserts, of a conventional capacitive accelerometer.

FIG. 9 illustrates a display 900 generated by the computer that retrieves the information from the VPIR 100 after the recordation of the impacts. The large, scale 902 can be colored to provide a visualization of the severity of the impact, along with a numerical value 904 shown on the right side of the panel. In the upper right is a elapsed time indicator 906, which fills to show the duration of the impact. In the lower right 908 is a time signature of four impacts which were recorded in this particular instance of information retrieval. The graph in the lower left 910 is the frequency signature of the impacts. In this case, the sensor was mounted on an ammunition box, which was filled with Al rods acting as simulated ammunition. The box was dropped on its bottom, rattling the rods and creating the characteristic frequency distribution of impacts. The time record 908 shows that impacts occurred about 1 to 2 seconds apart. It can be appreciated that the components illustrated on the display 900 are not particularly limiting, and that the display 900 can show other information regarding other factors such as temperature, humidity etc obtained from the VPIR.

The severity of impact, the display and the Fourier analysis are all automatically calculated and different predetermined safety limits regarding the vibrational impact for different applications can also be programmed into the software. This facilitates generating notifications if it is detected that the vibrational levels have exceeded the predetermined limits for a given application. For example, in the instant case, if the contents of the box were live ammunition, this measurement would indicate that the contents of the box are dangerous. The VPIR 100 in consonance with a processor (not shown) can thus be used to gain knowledge about the state of the objects to which the VPIR 100 is affixed and for which it records the impacts.

A self-powered vibration recording system and a method to detect a series of vibrations, shocks or impacts that occurred which are outside of the specification limits of an object such as a vehicle, a packaged ordnance etc are disclosed herein. Preferably, the system would be powered in such a way that would provide power through the lifetime of the object. It can be appreciated that the systems and method disclosed herein are not limited by their uses as described supra but can also be employed in transportation and storage of consumer goods, such as, medicines, delicate electronics or other fragile items.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    sensing motion of an object by at least one sensor connected to the object, the sensor including a movable mass;
    receiving an electrical indicator of the motion from the sensor;
    converting energy from the motion of the movable mass into electrical power in accordance with a linear conversion characteristic;
    powering one or more memory units using the electrical power;
    powering at least one further sensor using the electrical power, the at least one further sensor operating to sense at least one of temperature, humidity, and light experienced by the object;
    receiving an electrical indicator of the at least one of temperature, humidity, and light from the at least one further sensor at substantially the same time as receiving the electrical indicator of the motion of the object; and
    storing information relating to the electrical indicator of the motion and the electrical indicator of the at least one of temperature, humidity, and light in the one or more memory units.

2. The method of claim 1, wherein the electrical indicator of the motion relates to a charge induced within an electrical circuit using the energy from the motion.

3. The method of claim 2, wherein storing the information related to the electrical indicator of the motion further comprises providing power to transfer a signal comprising the information to a load comprising at least one of the one or more memory units using the induced charge.

4. The method of claim 3, wherein using the induced charge to provide power for the signal transfer to the load comprises using the induced charge to power one of a wireless or wired signal transfer.

5. The method of claim 3, wherein the induced charge is based on displacement of a mass located within the sensor, and the signal transfer occurs only when charge above a predefined threshold is induced.

6. The method of claim 2, wherein a magnitude of the induced charge is related to the amplitude of the motion.

7. The method of claim 1, wherein storing the information relating to the electrical indicator of the motion further comprises changing a state of at least one of the one or more memory units.

8. The method of claim 7, further comprising reading the at least one memory unit to determine whether the object is affected by a motion in a form of vibration, shock, impact or acceleration.

9. The method of claim 1, wherein the information relating to the electrical indicator of the motion includes one or more of amplitude, time of occurrence, direction or duration of the motion.

10. The method of claim 1, wherein at least two sensors are provided to sense the motion, the at least two sensors are connected to at least one of the memory units.

11. The method of claim 10, wherein providing the at least two sensors connected to the at least one memory unit comprises providing three impact sensors oriented in three mutually perpendicular directions connected to the at least one memory unit.

12. The method of claim 1, wherein the object is one of an ordnance, a vehicle, a machine or a container for goods.

13. A vibration powered impact recorder (VPIR), comprising:
   at least one detection component that detects occurrence of motion in an object;
   at least one recording component that records information related to the motion; and
   at least one vibration-based sensor that transforms energy from the motion received by the at least one detection component into useable electrical energy that powers at least one recording component,
   wherein the at least one vibration-based sensor comprises: (i) a base that remains in a fixed, rigid relationship relative to the object when connected thereto, (ii) a flexible electret operating to couple at least one movable mass to the base such that the motion of the object results in motion of the at least one movable mass relative to the base, and the flexible electret including at least one electrically charged side operating to move in response to the motion of the movable mass, (iii) at least one electrically conductive connector located proximate to the at least one electrically charged side of the flexible electret, such that the motion of the movable mass causes intermittent contact of the electrically conductive connector and the at least one electrically charged side and generates an induced charge as a linear function of the motion of the movable mass, and (iv) a charge storage device operating to receive the induced charge and produce the usable energy as a function of the motion of the object.

14. The vibration powered impact recorder (VPIR) of claim 13, wherein a sensitivity of the vibration powered impact recorder is adjustable such that only information from a signal associated with a predetermined minimum amplitude is recorded by the at least one recording component.

15. The vibration powered impact recorder (VPIR) of claim 13, further comprising one or more additional sensors to record one or more other parameters at a time of the occurrence of the motion.

16. The vibration powered impact recorder (VPIR) of claim 15, wherein the one or more additional sensors are connected to the at least one vibration-based sensor in order to receive power.

17. The vibration powered impact recorder (VPIR) of claim 13, comprising a plurality of detection components, oriented in different directions with one recording component.

18. The vibration powered impact recorder (VPIR) of claim 17, wherein three detection components are oriented along three mutually perpendicular axes.

19. The vibration powered impact recorder (VPIR) of claim 13, further comprising an outlet to transmit the recorded information to an external component.

20. The vibration powered impact recorder (VPIR) of claim 13, wherein the recording component is one or more non-volatile memory elements.

21. A vibration information retrieval system, comprising:
   a processor that determines a state of an object based on: (i) at least one of vibrations, shock, impact and acceleration, and (ii) at least one of temperature, humidity, and light, experienced by the object;
   a memory that stores instructions that cause the processor to determine the state of the object;
   at least one motion sensor connected to the object, the motion sensor including a movable mass and the sensor linearly converting energy from motion of the movable mass into electrical power used to power the processor and the memory, and producing an electrical indication of the motion of the object; and
   at least one further sensor operating to sense the at least one of temperature, humidity, and light experienced by the object and provide information relating thereto to the processor.

22. The system of claim 21, the processor operates to determine one or more of severity, frequency, direction duration or time of occurrence of the vibrations, shock, impact or acceleration from the information.

23. The system of claim 22, wherein the processor further operates to generate notifications if it is determined that the severity of the vibrations, shock, impact or acceleration or the one or more other factors exceeded one or more respective predetermined limits.

* * * * *